250-203.R 56
CROSS REFERENCE EXAMINER
Sept. 5, 1967 D. J. KYTE 3,340,481
APPARATUS FOR MODULATING THE OUTPUT OF PHOTOMULTIPLIER TUBES
Filed March 30, 1964
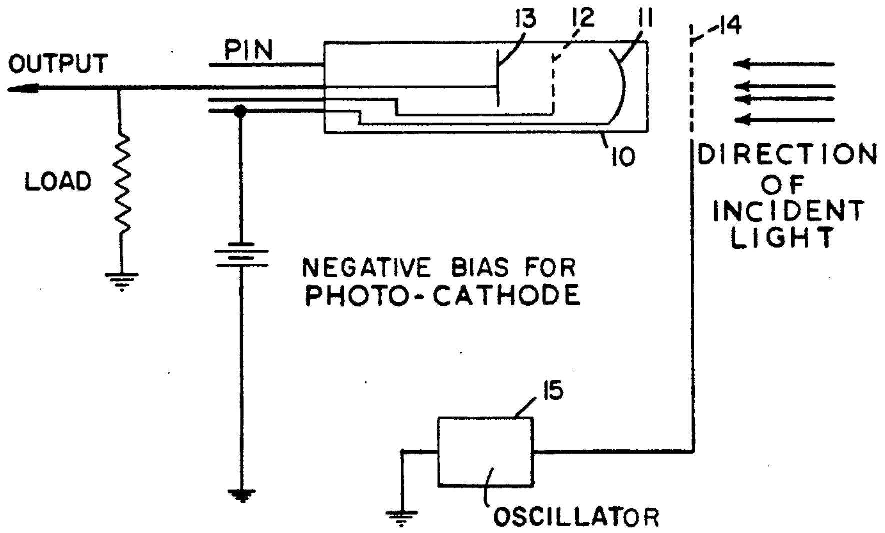

United States Patent Office 3,340,481
Patented Sept. 5, 1967

3,340,481
APPARATUS FOR MODULATING THE OUTPUT OF PHOTOMULTIPLIER TUBES
Derek John Kyte, 117 Valley Road, Chorleywood, England
Filed Mar. 30, 1964, Ser. No. 355,668
Claims priority, application Great Britain, Apr. 4, 1963, 13,523/63
8 Claims. (Cl. 332—3)

This invention relates to photomultiplier tubes, and has for its object the provision of means for modulating the output of such tubes throughout the kc./s. range and into the mc./s. range.

The main aspect of the invention comprises a method of modulating the electrical signals produced by a photomultipler by means of an electrostatic field.

A photomultiplier tube consists of a photo-cathode (which emits electrons when light falls on it) followed by one or more stages where electron multiplication takes place by the process of secondary emission.

The output of such a device consists of a current which depends on the amount of light falling on the photocathode. This current may be passed through a load resistor to produce a voltage drop which can be amplified by normal electronic methods.

When the level of light being detected is very low, the output voltage is correspondingly low. To amplify this voltage in a D.C. amplifier necessitates elaborate precautions against hum and drift. It is usual, therefore, to arrange that the output signal is in the form of an amplitude modulated carrier frequency. This can be amplified very easily in conventional A.C amplifiers and, if necessary, rectified to produce a D.C. output.

Methods which have been used to produce modulation include light chopping, dynode modulation and magnetic modulation.

Light chopping is usually achieved by interrupting the light falling on the photo-cathode by means of a rotating disc having a large number of alternate opaque and transparent segments. For stability of the carrier frequency, it is important that the disc is rotated at a constant speed. This is usually done by driving it from a synchronous motor. Such techniques are very satisfactory at low frequencies (say below 20 kc./s.). At higher frequencies of the order of 100 kc./s. or more, these techniques give rise to very great problems.

The method of dynode modulation relies on the fact that the gain of the photomultiplier tube is a function of the voltage difference between any pair of successive dynodes. If the voltage on one of these dynodes is varied at a constant frequency, the gain of the whole photomultiplier will also vary and the output will be an amplitude modulated carrier signal. This method of modulation gives a frequency doubling effect so that the output frequency is twice that of the frequency applied to a dynode.

Because of the internal capacitance between any dynode and the anode of the tube, a portion of the modulating frequency appears in the output even when no light falls on the cathode. Because of the frequency doubling effect, however, this leakage signal is half the frequency of the wanted signal and can thus be filtered out without difficulty. Should the modulating signal contain any second harmonic, however, this will be coupled capacitively to the anode and appear in the output as a spurious signal. It is, therefore, important that the modulating frequency is a pure sine wave and it should be filtered to achieve this. If the above precautions are observed, dynode modulation is satisfactory below 100 kc./s. but becomes more difficult as frequencies increase.

In the method of magnetic modulation, the electron stream in the photomultiplier is deflected periodically by an alternating magnetic field. Thus the current through the tube is modulated at twice the frequency of the applied field. It is usually most convenient to produce the field by a suitably shaped coil and to apply it to the region between the photo-cathode and the first dynode.

Magnetic modulation is satisfactory at low frequencies (say up to 50 kc./s.). At higher frequencies, eddy current losses in the metallic electrodes within the multiplier render the field less effective and at the same time heat up the electrodes and cause an increase in dark current.

A new method of modulating a multiplier has been developed. This method, known as electrostatic modulation, combines the advantages of great simplicity with an ability to operate up to high frequencies (at least 1 mc./s.) and will be described with reference to an embodiment shown in its essentials in the accompanying drawing which is a schematic diagram illustrating an embodiment of the invention.

The drawing illustrates a photomultiplier 10 having elements including a photo-cathode 11, a dynode 12 and a collector 13. In this method, a transparent conducting screen 14 is placed in front of and close to the photocathode 11 but external to the multiplier 10. For example this screen can conveniently take the form of a wire mesh with a high transparency or a piece of conducting glass, providing the latter transmits those light wavelengths with which one is concerned. Such a screen can, of course, be integrated into the construction of the photomultiplier tube.

A periodic positive voltage from the oscillator 15 is applied between the screen 14 and the photo-cathode 11.

If the photo-cathode 11 is at a high negative potential with respect to ground, which is often the case, then it is convenient to apply the oscillator output between screen 14 and ground, providing that the impedance between photo-cathode and ground is low at the oscillator frequency.

When the positive potential on the screen is high enough, the electrostatic field produced within the photocathode prevents electrons liberated by light from leaving it so that the photomultiplier current is cut-off. Thus by applying a varying positive potential at a certain frequency between the screen 14 and the photo-cathode 11, the output current of the photomultiplier varies at the same frequency as this applied voltage but is 180° out of phase with it. The amplitude of the output current depends on the amount of light which falls through the screen 14 onto the photo-cathode 11.

It is not essential that the output of the oscillator 15 is a periodic unipolar positive voltage. The system will also operate satisfactorily if the oscillator output is an alternating voltage.

With typical end-window photomultipliers peak-to-peak voltages of between 10 and 100 volts, depending on the type of photo-cathode, are necessary to achieve virtually 100% modulation.

This method does not work satisfactorily at very low frequencies (1 kc./s.). The reason is believed to be that at these low frequencies, a negative charge builds up on the inside of the glass window of the multiplier during the time when the external screen is positive. This charge prevents the field from penetrating the photo-cathode. Thus modulation becomes less and less effective as frequency decreases, ceasing entirely at D.C. It is believed that the mobility of the electrons responsible for this negative charge must be limited so that an appreciable time is necessary for the charge to build up.

Thus as the frequency increases the duration of the positive potential cycle eventually becomes small compared with the time required for a charge to form on the glass. Modulation can then occur.

Direct capacitative coupling between the external screen and the anode of the photomultiplier is so small that leakage of the modulating frequency into the output in the absence of light can easily be kept to a magnitude comparable with the dark current.

It will be seen that a new method of modulating the output from a photomultiplier has been developed which works up to very high frequencies without difficulty and is thus especially useful where the bandwidth of the light signal is large.

Satisfactory results have been obtained with wire mesh screens of one-eighth inch pitch and of thirty to forty thousandths of an inch pitch in front of a photo-cathode one inch square. The size of the mesh is not critical, providing its transparency is adequate.

The screen is mounted in closely spaced relation to the transparent end of the photomultiplier tube, which end contains the photocathode, and is on a support also carrying the tube.

What I claim is:

1. Photomultiplier equipment comprising a photomultiplier tube, a light transparent electrically-conducting screen placed in closely-spaced relation to the photo-cathode of the tube in the light path thereto, power supply for said equipment, and an oscillator connected between said screen and the power supply so as to apply a periodic positive voltage to the screen with respect to the cathode.

2. Photomultiplier equipment as claimed in claim 1 wherein said screen is made of wire mesh.

3. Photomultiplier equipment as claimed in claim 1 wherein said screen is made of conducting glass.

4. Photomultiplier equipment as claimed in claim 1 wherein the photo-cathode is connected via a low impedance path to high negative potential and the oscillator is connected between the screen and ground.

5. Photomultiplier equipment as claimed in claim 1 wherein said oscillator is arranged to supply periodic unipolar positive voltage.

6. Photomultiplier equipment as claimed in claim 1 wherein said oscillator is arranged to supply an alternating voltage.

7. In a photomultiplier apparatus for making quantitative measurements of radiant energy and comprising a photomultiplier tube having element means including a photo-cathode which emits electrons when radiant energy, traveling a predetermined path, falls upon it, the improvement comprising: a light transparent electrically-conducting screen positioned in said path adjacent said cathode; and means connected to said element means and said screen to apply a pulsating electrostatic potential to said screen to modulate the release of electrons from said cathode.

8. In an apparatus as set forth in claim 1, wherein the last identified means applies pulses having a positive potential in excess of about 10 volts to said screen.

References Cited

UNITED STATES PATENTS

| | | | |
|---|---|---|---|
| 2,061,113 | 11/1936 | Sukumlyn | 315—10 |
| 2,646,533 | 7/1953 | Carne | 313—99 X |
| 3,154,710 | 10/1964 | Parker | 313—103 X |

ROY LAKE, *Primary Examiner.*

ALFRED L. BRODY, *Examiner.*